US012741204B2

(12) United States Patent
Gupta et al.

(10) Patent No.: US 12,741,204 B2
(45) Date of Patent: Sep. 22, 2026

(54) SYSTEMS AND METHODS FOR OPTIMIZING A STREAMED VIDEO GAME RENDERING PIPELINE

(71) Applicant: Netflix, Inc., Los Gatos, CA (US)

(72) Inventors: Nitin Gupta, Los Gatos, CA (US); Kyle Weicht, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 265 days.

(21) Appl. No.: 18/506,886

(22) Filed: Nov. 10, 2023

(65) Prior Publication Data

US 2025/0153044 A1 May 15, 2025

(51) Int. Cl.
*A63F 13/355* (2014.01)

(52) U.S. Cl.
CPC ...... *A63F 13/355* (2014.09); *A63F 2300/538* (2013.01)

(58) Field of Classification Search
CPC ......................... A63F 13/355; A63F 2300/538
See application file for complete search history.

(56) References Cited

U.S. PATENT DOCUMENTS 10,589,171 B1 * 3/2020 Burke ..................... G06T 15/00
11,344,799 B2 * 5/2022 Cerny .................. H04N 19/115
2022/0138902 A1 * 5/2022 Lea ........................ G06N 3/045 382/299
2024/0307773 A1 * 9/2024 Panneer .................. A63F 13/52
2024/0312111 A1 * 9/2024 Panneer .................... G06T 7/20
2024/0325885 A1 * 10/2024 Panneer .................... G06T 1/20

OTHER PUBLICATIONS

International Search Report and Written Opinion for International PCT Application No. PCT/US2024/055086, mailed Mar. 7, 2025; 8 pages.

* cited by examiner

*Primary Examiner* — Ankit B Doshi
(74) *Attorney, Agent, or Firm* — Hogan Lovells Cadwalader US LLP

(57) ABSTRACT

The disclosed computer-implemented methods and systems optimize a rendering pipeline for rendering tasks associated with streamed video games. For example, the disclosed methods and systems amortize the fixed costs of these rendering tasks across multiple video game frames by combining a batch of frames into a single combined image. The disclosed systems and methods then perform rendering tasks such as frame generation and upscaling in connection with the single combined image. The disclosed system and methods further separate the combined image into its component frames prior to encoding and streaming those frames to one or more streaming clients. Various other methods, systems, and computer-readable media are also disclosed.

20 Claims, 4 Drawing Sheets

SYSTEMS AND METHODS FOR OPTIMIZING A STREAMED VIDEO GAME RENDERING PIPELINE

BACKGROUND

Rendering video game frames is often an intensive process that incurs costs across both a computer's central processing unit (CPU) and graphics processing unit (GPU). In an effort to reduce these costs, systems like NVIDIA Deep Learning Super Sampling (DLSS) allow a graphics pipeline to run at a lower resolution, and then utilize machine learning to infer higher resolution images at a higher frame rate.

These systems, however, are not appropriate for all rendering tasks. Typically, technologies like DLSS are used to increase the frame rate and resolution of video games that already have fairly high frame rates and resolutions. As such, these technologies generally fail to scale down for smaller rendering tasks such as rendering tasks connected to streaming video games over a network. To illustrate, DLSS is typically used to increase the resolution and frame rate of a video game from 1080p resolution to 4K resolution, and 60 frames per second to 120 frames per second. When a video game is streamed over a network, for example, associated rendering tasks include much lower resolutions and frame rates (e.g., closer to 540p resolution and 15 frames per second).

Technologies like DLSS include fixed costs (e.g., one millisecond per frame) in addition to scaled costs (e.g., one nanosecond per pixel in that frame). As such, the fixed costs are negligible when utilizing DLSS in connection with frames that start at high resolution. Conversely, when utilized in connection with lower-resolution frames, the fixed costs of DLSS are often too high—causing system lag and other bottlenecking. As such, existing techniques for optimizing a rendering pipeline are generally inapplicable to rendering tasks associated with streamed video games.

SUMMARY

As will be described in greater detail below, the present disclosure describes implementations that optimize a graphics rendering pipeline for streamed video games. For example, implementations include combining a predetermined number of rendered video game frames received at a first frame rate and a first resolution into a first combined image, generating, from the first combined image, a second combined image including a predetermined number of additional video game frames at the first resolution, upscaling the first combined image and the second combined image to a second resolution, separating the first combined image into the predetermined number of rendered video game frames and the second combined image into the predetermined number of additional video game frames, and encoding the predetermined number of rendered video game frames separated from the first combined image and the predetermined number of additional video game frames separated from the second combined image for transmission to one or more client devices at a second frame rate.

In some implementations, the second resolution is greater than the first resolution. In one example, the first resolution is 720p and the second resolution is 1080p. Additionally, in some implementations, the second frame rate is greater than the first frame rate. In one example, the first frame rate is fifteen frames per second and the second frame rate is thirty frames per second.

Additionally, in some implementations, the predetermined number of rendered video game frames is four, and the predetermined number of additional video game frames is four. In at least one implementation, the predetermined number of rendered video game frames are received from separate video game processes. In one or more implementations, the predetermined number of rendered video game frames separated from the first combined image and the predetermined number of additional video game frames separated from the second combined image are encoded individually. Some implementations also include transmitting the encoded predetermined number of rendered video game frames separated from the first combined image and the encoded predetermined number of additional video game frames separated from the second combined image to the one or more client devices in sequence.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including combining a predetermined number of rendered video game frames received at a first frame rate and a first resolution into a first combined image, generating, from the first combined image, a second combined image including a predetermined number of additional video game frames at the first resolution, upscaling the first combined image and the second combined image to a second resolution, separating the first combined image into the predetermined number of rendered video game frames and the second combined image into the predetermined number of additional video game frames, and encoding the predetermined number of rendered video game frames separated from the first combined image and the predetermined number of additional video game frames separated from the second combined image for transmission to one or more client devices at a second frame rate.

In some examples, the above-described method is encoded as computer-readable instructions on a computer-readable medium. In one example, the computer-readable instructions, when executed by at least one processor of a computing device, cause the computing device to combine a predetermined number of rendered video game frames received at a first frame rate and a first resolution into a first combined image, generate, from the first combined image, a second combined image including a predetermined number of additional video game frames at the first resolution, upscale the first combined image and the second combined image to a second resolution, separate the first combined image into the predetermined number of rendered video game frames and the second combined image into the predetermined number of additional video game frames, and encode the predetermined number of rendered video game frames separated from the first combined image and the predetermined number of additional video game frames separated from the second combined image for transmission to one or more client devices at a second frame rate.

In one or more examples, features from any of the implementations described herein are used in combination with one another in accordance with the general principles described herein. These and other implementations, features, and advantages will be more fully understood upon reading the following detailed description in conjunction with the accompanying drawings and claims.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
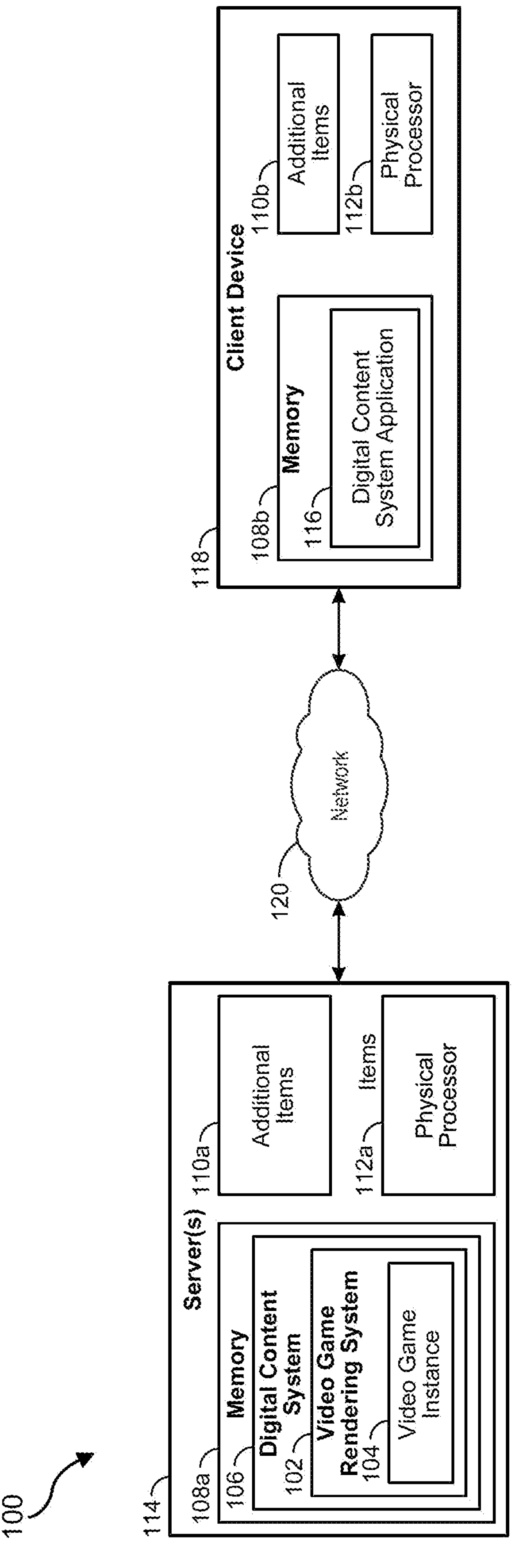
FIG. 1 is a block diagram of an exemplary environment for implementing a video game rendering system in accordance with one or more implementations.

Throughout the drawings, identical reference characters and descriptions indicate similar, but not necessarily identical, elements. While the exemplary implementations described herein are susceptible to various modification and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As discussed above, conventional optimization systems for graphics rendering pipelines often cannot be used in connection with streamed video games because the fixed costs associated with those systems are generally too high. For example, DLSS optimizes graphics generation by processing lower-resolution frames at slower frame rates and then utilizes machine learning to infer higher-resolution frames at faster frame rates. As such, DLSS can increase frames at 1080p resolution and 60 frames per second to 4K resolution and 120 frames per second. When used in connection with frames that have a higher initial resolution, the fixed costs of DLSS are negligible.

Despite this, as mentioned above, technologies like DLSS are often not suitable for optimizing graphics rendering pipelines that start with lower-resolution images at slower frame rates. In many examples, digital video game frames stream over networks at lower resolutions and with slower frame rates. To illustrate, in one example, a digital content system streams digital video game frames over a network at 540p resolution with a frame rate of only 15 frames per second. As such, the fixed costs associated with technologies like DLSS are too high to be used in connection with streamed video game rendering because they create processor slowdowns and other undesirable computational issues.

In light of this, the present disclosure describes systems and methods that amortize the fixed costs of rendering pipeline optimization across multiple video game frames within a video game streaming environment-thereby making it possible to utilize machine learning in connection with streamed video game rendering tasks. In most examples, these systems and methods almost double the throughput of the rendering pipeline in connection with lower-resolution, streamed video game frames. In one or more examples, the systems and methods discussed herein combine multiple rendered video game frames (e.g., at lower resolutions) into a single combined image. The systems and methods apply a frame generator to the combined image to generate an additional inferred image, and then upscales the resolution for both the combined image and the combined image inferred by the frame generator. In most examples, the systems and methods then separate the upscaled images into their component video game frames, and push these video game frames into an encoder for eventual streaming to one or more client devices. As such, the systems and methods described herein increase the resolution and frame rate of video game frames while optimizing the fixed costs associated with frame generation and upscaling.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
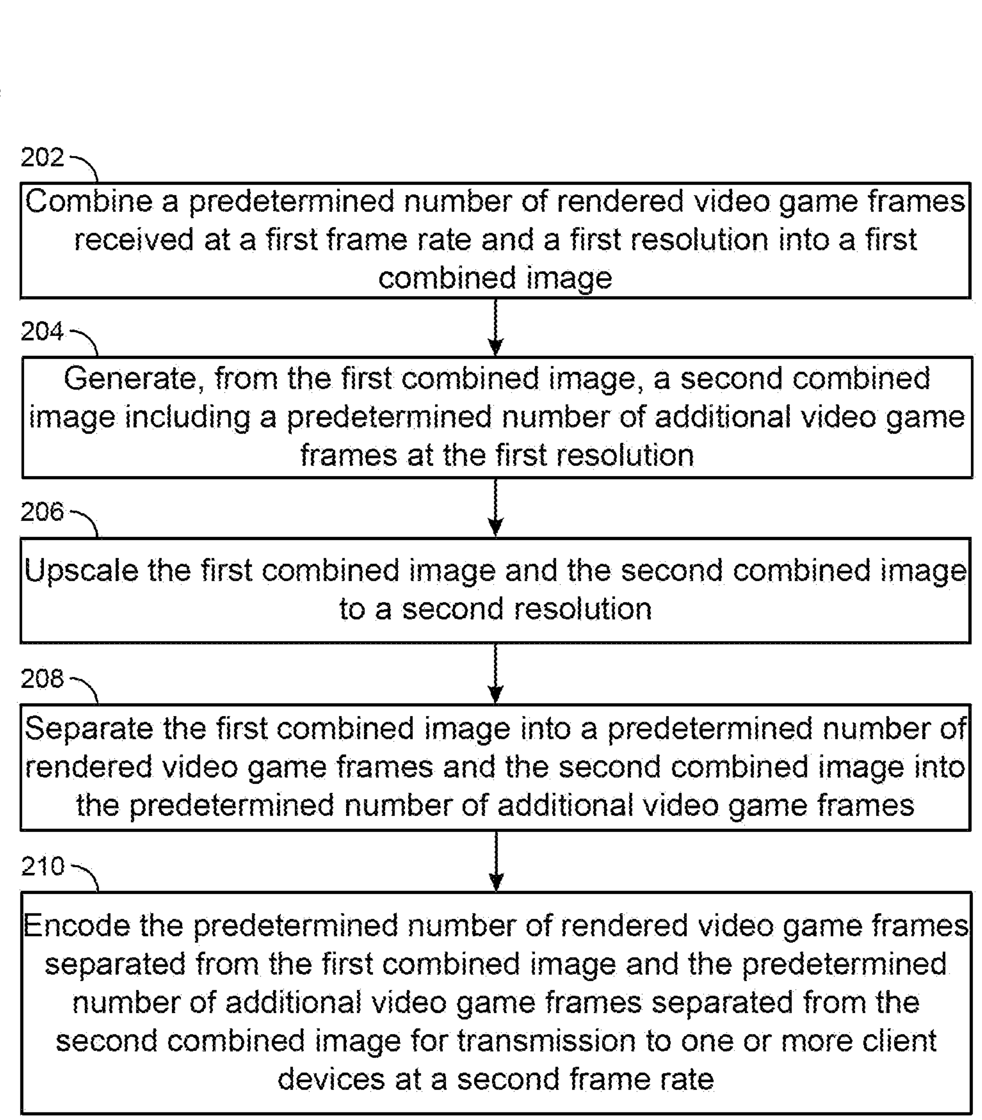
FIG. 2 is a flow diagram of an exemplary computer-implemented method for optimizing a streamed video game rendering pipeline in accordance with one or more implementations.
Figure 3:
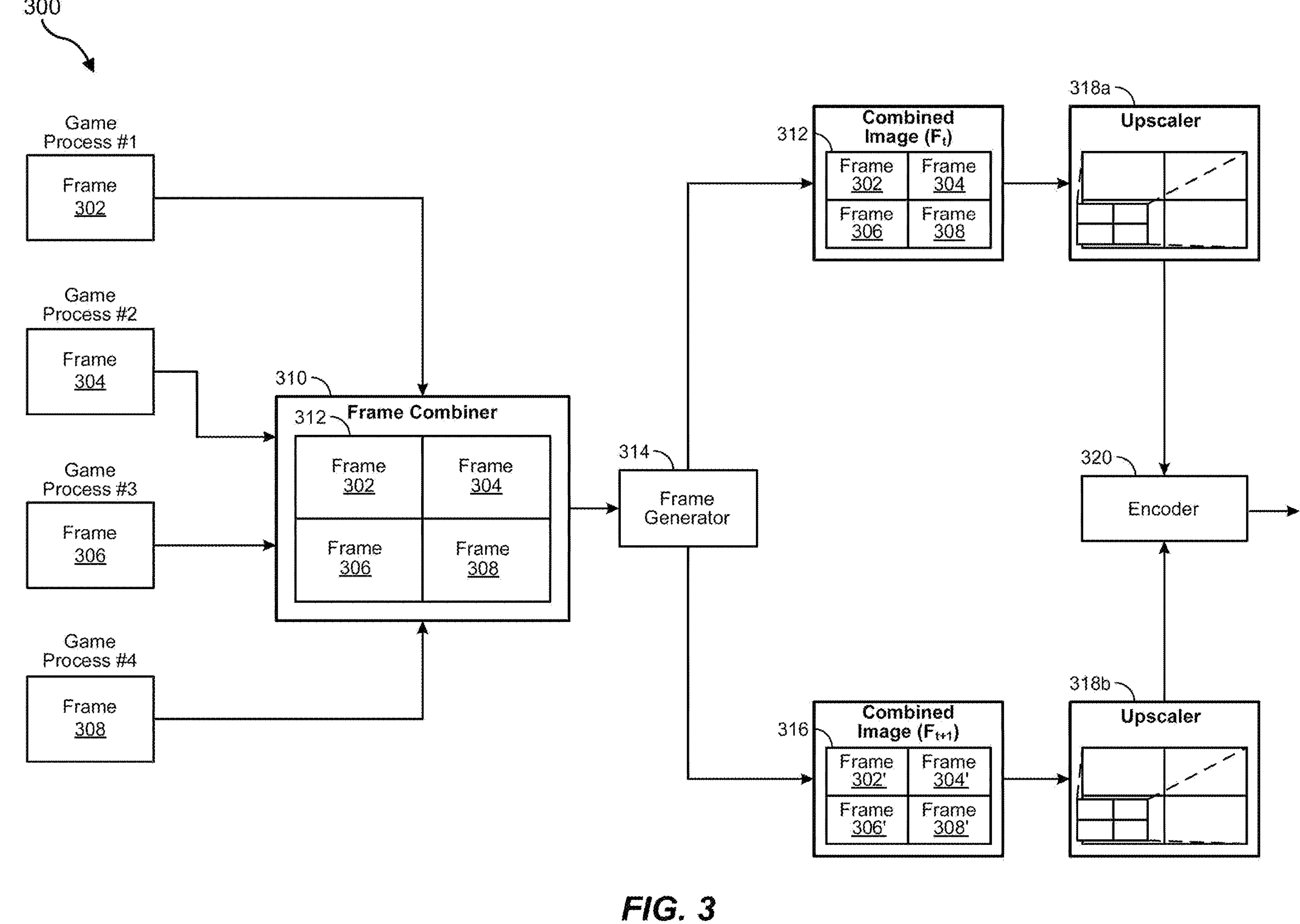
FIG. 3 illustrates steps taken by the video game rendering system to optimize a streamed video game rendering pipeline in accordance with one or more implementations.
Figure 4:
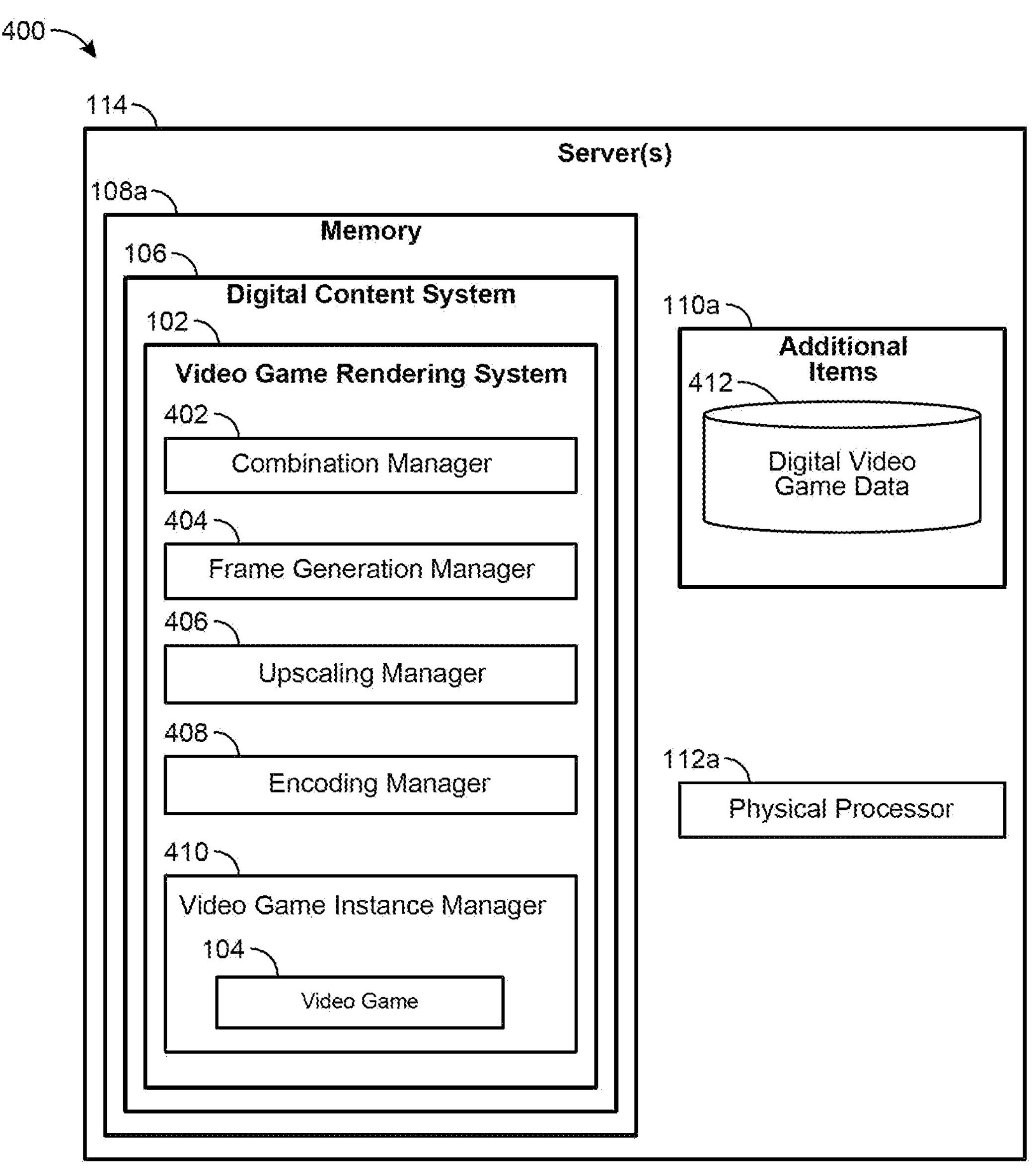
FIG. 4 is a detailed diagram of the video game rendering system in accordance with one or more implementations.

The following will provide, with reference to FIGS. 1-4, detailed descriptions of a video game rendering system that optimizes a frame rendering pipeline to increase the resolution and frame rate of streamed video game frames without incurring the standard fixed costs of this optimization. For example, an exemplary network environment is illustrated in FIG. 1 to show the video game rendering system operating in connection with a client device that is streaming a video game. FIG. 2 illustrates steps taken by the video game rendering system in connection with the optimized video game frame rendering pipeline, while FIG. 3 illustrates the optimized video game frame rendering pipeline. Finally, FIG. 4 provides additional detail with regard to the features and functionality of the video game rendering system.

As just mentioned, FIG. 1 illustrates an exemplary networking environment 100 implementing aspects of the present disclosure. For example, the networking environment 100 includes server(s) 114, a client device 118, and a network 120. As further shown, the server(s) 114 and the client device 118 include memories **108*a* and 108*b*, additional items 110*a* and 110*b*, and physical processors 112*a* and 112*b***, respectively.

In one or more implementations, as shown in FIG. 1, the client device 118 is a device that is capable of video game play. For example, in some implementations, the client device 118 is a television. In additional implementations, the client device 118 is a smartphone, a tablet, a laptop computer, a desktop computer, a smart wearable, a virtual reality headset, and so forth. As such, the client device 118 typically includes both a display and one or more types of input.

As further shown in FIG. 1, a video game rendering system 102 is implemented as part of a digital content system 106 within the memory **108*a* on the server(s) 114. In one or more implementations, the digital content system 106 includes a subscription streaming service for providing digital media content subscribers. In one or more examples, this digital media content includes non-interactive content such as movies and TV shows, as well as interactive content such as video games. As such, and in response to a subscriber's selection of a particular video game, the video game rendering system 102 accesses the video game code and starts a video game instance 104. In one or more examples, the video game rendering system 102 detects user interactions with the client device 118 (e.g., via a game controller) in connection with the video game instance 104 and renders video game frames based on the user interactions. The video game rendering system 102 then encodes the rendered frames and transmits or streams the encoded frames to the client device 118** for display.

As further shown in FIG. 1, the client device 118 includes a digital content system application 116 within the memory 108*b* thereon. In some implementations, the digital content system application 116 includes some or all of the functionality of the video game rendering system 102. In at least one implementation, the digital content system application 116 transmits user interaction data to the video game rendering system 102. Moreover, in some implementations, the digital content system application 116 further receives encoded video game frames from the video game rendering system 102. As such, the digital content system application 116 also decodes the received video game frames and displays or rasterizes the video game frames for viewing via the client device 118.

As mentioned above, the client device 118 is communicatively coupled with the server(s) 114 through the network 120. In one or more implementations, the network 120 represents any type or form of communication network, such as the Internet, and includes one or more physical connections, such as a LAN, and/or wireless connections, such as a WAN. In some implementations, the network 120 represents a telecommunications carrier network. In at least one implementation, the network 120 represents combinations of networks.

Although FIG. 1 illustrates components of the exemplary networking environment 100 in one arrangement, other arrangements are possible. For example, in one implementation, the video game rendering system 102 operates as a native application installed on the client device 118. In another implementation, the video game rendering system 102 operates across multiple servers. Moreover, in some implementations, the exemplary networking environment 100 includes multiple client devices—each running the same or different video games via the digital content system 106. For example, in that implementation, the video game rendering system 102 supports video game instances for each video game that is being played.

In one or more implementations, and as will be explained in greater detail below, the methods and steps performed by the video game rendering system 102 reference multiple terms. To illustrate, in one example, a "digital video game" refers to a digital program that causes game graphics to be rendered on a display device, such as the client device 118, as user inputs are received that manipulate or interact with the rendered game graphics. A video game typically includes points, places, junctures, levels, characters, and other displayed objects. Moreover, in most video games, objects, characters, and so forth are interactive and/or customizable. As used herein, a "video game frame" refers to a single image from a sequence of images generated by video game source code. In one or more examples, multiple video game frames are displayed in sequence to create movement of characters, objects, items, etc. within a display of the video game.

As used herein, the term "frame rate" refers to a number of frames that are displayed during a given period of time. For example, many frame rates are described as a number of frames per second (fps). Typically, a higher frame rate causes the motion of characters, objects, items, etc. within a display to appear smoother and more life-like. As used herein, the term "resolution" refers to pixel dimensions of a frame. For example, a resolution of 1024×768 generally refers to the width and height of a frame in pixels. In many examples, a frame's resolution is referred to by either its width or its height (e.g., "1080p" has a height of 1080 pixels and a width of 1920 pixels, "4k" has a width of 3840 pixels and a height of 2160 pixels). Typically, higher resolution frames include a higher level of detail and appear more photorealistic.

As mentioned above, FIG. 2 is a flow diagram of an exemplary computer-implemented method 200 for optimizing a streamed video game rendering pipeline across multiple video game instances. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the video game rendering system 102 combines a predetermined number of rendered video game frames received at a first frame rate and a first resolution into a first combined image. For example, in some implementations, the video game rendering system 102 combines four rendered video game frames from four separate video game processes into a single image. In some examples, the four separate video game processes are from four separate instances of the same streamed video game. In additional examples, the four separate video game processes are from four instances of different streamed video games.

As further illustrated in FIG. 2, at step 204 the video game rendering system 102 generates, from the first combined image, a second combined image comprising a predetermined number of additional video game frames at the first resolution. For example, in most examples, the video game rendering system 102 applies a frame generator to the combined single image. In one or more implementations, the frame generator infers the second combined image from the video game frames in the original combined image. In many examples, this inference is based on motion vectors and other indicators of movement in the video game frames in the original combined image.

As further illustrated in FIG. 2, at step 206 the video game rendering system 102 upscales the first combined image and the second combined image to a second resolution. For example, in one or more examples, the video game rendering system 102 applies one or more upscalers to the first or original combined image and the second inferred combined image. In most examples, the one or more upscalers increase the resolution of an image and then utilize machine learning to fill-in any resulting blanks between the pixels as they stretch to the new resolution.

As further illustrated in FIG. 2, at step 208 the video game rendering system 102 separates the first combined image into the predetermined number of rendered video game frames and the second combined image into the predetermined number of additional video game frames. For example, the video game rendering system 102 separates the first combined image into four rendered video game frames and the second combined image into another four rendered video game frames. By this point, the separated video game frames are at a higher resolution than the original video game frames obtained from the separate video game processes.

As further illustrated in FIG. 2, at step 210 the video game rendering system 102 encodes the predetermined number of rendered video game frames separated from the first combined image and the predetermined number of additional video game frames separated from the second combined image for transmission to one or more client devices at a second frame rate. For example, the video game rendering system 102 encodes the separated video game frames in sequence such that a video game frame and its corresponding generated or inferred video game frame are encoded one after the next. At this point, the video game rendering system 102 has encoded twice the original number of video game frames—each at a higher resolution. In this way, the video game rendering system 102 has optimized the streamed video game rendering pipeline to nearly twice the throughput without incurring any additional fixed costs associated with frame generation and upscaling.

FIG. 3 illustrates additional detail with regard to the process by which the video game rendering system 102 optimizes a streamed video game rendering pipeline 300. In many examples, as shown in FIG. 3, the streamed video game rendering pipeline 300 begins with video game frames 302, 304, 306, and 308. In one or more implementations, each of the video game frames 302-308 are obtained by or provided to the video game rendering system 102 from various video game processes (e.g., the video game processes #1, #2, #3, and #4). In at least one implementation, the video game processes are from separate instances of the same video game hosted by the video game rendering system 102 (e.g., the video game instance 104). In additional implementations, the video game processes are from separate instances of different video games hosted by the video game rendering system 102.

As mentioned above, in many examples, the digital content system 106 streams digital video games to subscribers at lower frame rates and resolutions than are typical for console-based video games. To illustrate, in one example, each of the video game frames 302-308 is rendered at 720p resolution and streamed at 15 frames per second (fps). This is much lower than the 60 fps/1080p resolution frames that are typical of console-based video game displays. Despite this, as discussed above, applying frame generation and upscaling to individual frames incurs fixed rendering costs that slow down the rendering pipeline in connection with streaming video games.

To optimize both the resolution and frame rate of streamed video game frames while increasing overall pipeline throughput, the video game rendering system 102 combines the frames 302-308 into a single image. For example, as shown in FIG. 3, the video game rendering system 102 applies a frame combiner 310 to the frames 302-308 to create a single combined image 312. In one implementation, the frames 302-308 are 720p resolution. As such, the frame combiner 310 combines the frames 302-308 into the single combined image 312 that includes 2K resolution. As such, the video game rendering system 102 amortizes the costs associated with additional processes like frame generation and upscaling across all of the frames 302-308 rather than incurring the same costs on each of the frames 302-308 one-by-one.

The video game rendering system 102 further applies a frame generator 314 to the combined image 312. As mentioned above, the frame generator 314 increases the frame rate of a series of frames by generating inferred, intermediate frames. To illustrate, the frame generator 314 generates an artificial frame between two existing frames by calculating motion vectors for objects and articles shown in the existing frames. The frame generator 314 then utilizes machine learning to infer positioning for those objects and articles in the artificial frame. When placed in sequence between the existing frames, the generated frame increases the frame rate of the sequence—giving a performance boost that improves the experience of a viewer.

As such, and as further shown in FIG. 3, the video game rendering system 102 applies the frame generator 314 to the single combined image 312. In one or more examples, the frame generator 314 outputs both the single combined image 312 (Ft) and an additional, inferred combined image 316 (Ft+1). In at least one implementation, the inferred combined image 316 includes the video game frames 302', 304', 306', and 308'. As discussed above, the video game frames 302'-308' include the same articles and objects as the corresponding original frames 302-308, but with positioning that is inferred and updated by the frame generator 314.

Next, the video game rendering system 102 applies upscalers **318*a*, 318*b* to the single combined image 312 and the inferred combined image 316, respectively. As mentioned above, the upscalers 318*a*, 318*b* utilize an interpolation algorithm that infers pixel data based on existing pixels in each of the single combined image 312 and the inferred combined image 316. By adding these inferred pixels back into the images single combined image 312 and the inferred combined image 316, the upscalers 318*a*, 318*b* increase the resolution of both images. In this way, for example, the upscalers 318*a*, 318*b* increase the resolution of the single combined image 312 and the inferred combined image 316 from 2K to 4K. This resolution increase means that the component frames 302-308 and 302'-308' of the single combined image 312 and the inferred combined image 316**, respectively, are increased from 720p to 1080p.

In one or more implementations, the video game rendering system 102 separates the single combined image 312 and the inferred combined image 316 into their component frames prior to encoding the frames for transmission. To illustrate, in one example, the video game rendering system 102 separates each of the single combined image 312 and the inferred combined image 316 based on the number and dimension of the frames that were combined by the frame combiner 310 and the scaling factor applied by the upscalers **318*a*, 318*b*. Based on this information, the video game rendering system 102 effectively crops the single combined image 312 and the inferred combined image 316 into the now-upscaled frames 302-308 and 302'-308'. In at least one implementation, the video game rendering system 102 further places the frames 302-308 and 302'-308' in sequence such that the frames 302 and 302'** are encoded one after the other, and so forth.

Finally, the video game rendering system 102 applies an encoder 320 to the separated frames 302-308 and 302'-308'. In one or more implementations, the encoder 320 encodes each frame for transmission or streaming to one or more client devices (e.g., such as the client device 118). In at least one implementation, the encoder 320 keeps track of the video game instances from which the original frames 302-308 originated. The encoder 320 then streams the optimized frames accordingly. At the point of transmission, the pipeline 300 is streaming video game frames at twice the resolution and frame rate while incurring very little additional cost beyond the fixed costs associated with the frame generator 314 and the upscalers **318*a*, 318*b***.

To illustrate how the video game rendering system 102 increases the throughput of the pipeline 300, an example estimate includes the cost of the pipeline 300 as:

$$(4*FRT(720p))+(4*C(720p))+$$

-continued $$(FGT(2K))+(2*UT(2K->4K))+(2*ET(4K))$$

Where FRT(720p) is the time to render four video game frames at 720p resolution, C(720p) is the cost of combining the four video game frames into a single combined image, FGT(2K) is the time to generate the inferred combined image based on the 2K single combined image, UT(2K→4K) is the time to upscale the single combined image and the inferred combined image from 2K resolution to 4K resolution, and ET(4K) is the time to encode the frames separated from the upscaled combined image and inferred combined image.

In comparison, an existing system that does not amortize pipeline costs across multiple frames can include estimated costs as follows:

$$(4*(FRT(720p)+FGT(720p)))+(8*(UT(720p->1080p)+ET(1080p)))$$

To further illustrate the cost savings (e.g., expected speedup) of the pipeline 300, assume the following example estimates:

$$FRT(720p)=1\text{ millisecond}$$

$$C=0.25*FRT$$

$$FGT=0.5*FRT$$

$$FGT(2K)=1.5*FGT(720p)$$

$$UT(720p->1080p)=1.5\text{ millisecond}$$

$$UT(2K->4K=1.7\text{ millisecond}$$

$$ET(4K)=2*ET(1080p)$$

$$ET(2K)=2*ET(1080p)$$

$$ET(1080p)=1.5*ET(720p)$$

$$ET(720p)=1.5*FRT(720p)$$

According to these example estimates, the cost of the pipeline 300 can be shown as:

$$4*1+4*0.25+1.5*0.5*1+2*1.7+2*2*1.5*1.5msec=18.15\text{ milliseconds}$$

Additionally, according to the example estimates, the cost of an existing system's pipeline (e.g., without frame combination) can be shown as:

$$4*(1+0.5)+8*(1.5+1.5*1.5*1)msec=36.0\text{ milliseconds}$$

Accordingly, while both pipelines result in 8 frames at 1080p resolution, the pipeline 300 performs at 36.0 milliseconds/18.15 milliseconds=1.98 times the speed of the existing system's pipeline. As such, the pipeline 300 almost doubles the throughput of the existing system's pipeline.

As mentioned above, and as shown in FIG. 4, the video game rendering system 102 performs various functions in connection with optimizing rendering pipelines for streamed video games. FIG. 4 is a block diagram 400 of the video game rendering system 102 operating within the memory 108*a* of the server(s) 114 while performing these functions. As such, FIG. 4 provides additional detail with regard to these functions. For example, in one or more implementations as shown in FIG. 4, the video game rendering system 102 includes a combination manager 402, a frame generation manager 404, an upscaling manager 406, an encoding manager 408, and a video game instance manager 410 in addition to the video game instance 104. As further shown in FIG. 4, the additional items 110*a* stores and maintains video game data 412.

In certain implementations, the video game rendering system 102 represents one or more software applications, modules, or programs that, when executed by a computing device, may cause the computing device to perform one or more tasks. For example, and as will be described in greater detail below, one or more of the combination manager 402, the frame generation manager 404, the upscaling manager 406, the encoding manager 408, and the video game instance manager 410 may represent software stored and configured to run on one or more computing devices, such as the server(s) 114. One or more of the combination manager 402, the frame generation manager 404, the upscaling manager 406, the encoding manager 408, or the video game instance manager 410 of the video game rendering system 102 shown in FIG. 4 may also represent all or portions of one or more special purpose computers to perform one or more tasks.

As mentioned above, and as shown in FIG. 4, the video game rendering system 102 includes the combination manager 402. In one or more implementations, the combination manager 402 combines video game frames into a single image. For example, the combination manager 402 receives or extracts video game frames from one or more processes of one or more instances of a single video game or multiple video games. In one or more examples, the combination manager 402 combines the video game frames by copying the frames into a single buffer.

As mentioned above, and as shown in FIG. 4, the video game rendering system 102 includes the frame generation manager 404. In one or more implementations, the frame generation manager 404 trains, maintains, and applies the frame generator 314. For example, in one implementation, the frame generation manager 404 trains the frame generator 314 by repeatedly applying the frame generator 314 to training data, comparing the outputs to training ground truths, and backpropagating the results through the frame generator 314 until the comparisons between outputs and training ground truths converge. In some implementations, the frame generation manager 404 periodically re-trains the frame generator 314 in the same manner.

As mentioned above, and as shown in FIG. 4, the video game rendering system 102 includes the upscaling manager 406. In one or more implementations, the upscaling manager 406 trains, maintains, and applies the one or more upscalers 318*a*, 318*b*. For example, as with the frame generation manager 404 discussed above, the upscaling manager 406 trains the upscalers 318*a*, 318*b* utilizing training data and training ground truths associated with upscaling images. In some implementations, the upscaling manager 406 configures the upscalers 318*a*, 318*b* to double the resolution of input images. In additional implementations, the upscaling manager 406 configures the upscalers 318*a*, 318*b* to change the resolution according to a user selection (e.g., triple the resolution, any other scaling factor).

As mentioned above, and as shown in FIG. 4, the video game rendering system 102 includes the encoding manager 408. In one or more implementations, the encoding manager 408 separates combined images into their component frames and encodes the frames for transmission. For example, the encoding manager 408 separates combined images based on the video game frames input into the frame combiner 310 and the scaling factor applied by the frame generator 314. The encoding manager 408 then encodes the separated video game frames for streaming across the network 120 from the digital content system 106 to the digital content system application 116 on the client device 118. The digital content system application 116 then decodes the video game frames and displays the video game frames in sequence.

As mentioned above, and as shown in FIG. 4, the video game rendering system 102 includes the video game instance manager 410. In one or more implementations, the video game instance manager 410 starts and manages one or more video game instances (e.g., such as the video game instance 104). For example, in response to user selections via the digital content system application 116, the video game instance manager 410 instantiates one or more video games and manages those video game instances as users interact with the video game instances.

As shown in FIGS. 1 and 4, the server(s) 114 and the client device 118 include one or more physical processors, such as the physical processors 112*a*, 112*b*, respectively. The physical processors 112*a*, 112*b* generally represent any type or form of hardware-implemented processing unit capable of interpreting and/or executing computer-readable instructions. In one implementation, the physical processors 112*a*, 112*b* access and/or modify one or more of the components of the video game rendering system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally as shown in FIGS. 1 and 4, the server(s) 114 and the client device 118 include memories 108*a* and 108*b*, respectively. In one or more implementations, the memories 108*a*, 108*b* generally represent any type or form of volatile or non-volatile storage device or medium capable of storing data and/or computer-readable instructions. In one example, the memories 108*a*, 108*b* store, load, and/or maintain one or more of the components of the video game rendering system 102. Examples of the memories 108*a*, 108*b* include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 114 includes the additional items 110*a*. On the server(s) 114, the additional items 110*a* include the video game data 412. In one or more implementations, the video game data 412 includes source code for one or more digital video games available for play via the digital content system 106. For example, the video game instance manager 410 accesses the video game data 412 to initiate video game instances.

In summary, the video game rendering system 102 optimizes a rendering pipeline for streamed video games by enabling video game frames to be rendered at lower resolutions and frame rates, and then increasing the resolutions and frame rates prior to streaming. As discussed above, the video game rendering system 102 batches frames together into combined images prior to frame generation and upscaling as a way of amortizing the costs of those processes across multiple frames. By spreading out these costs, the video game rendering system 102 optimizes the rendering pipeline to increase typical throughput without incurring any additional costs. As such, the video game rendering system 102 provides higher-quality video game displays to a streaming client without suffering slowdowns or processor hangups that would typically occur with streamed video game rendering tasks.

EXAMPLE EMBODIMENTS

Example 1: A computer-implemented method for optimizing a streamed video game frame rendering pipeline. For example, the method may include combining a predetermined number of rendered video game frames received at a first frame rate and a first resolution into a first combined image, generating, from the first combined image, a second combined image including a predetermined number of additional video game frames at the first resolution, upscaling the first combined image and the second combined image to a second resolution, separating the first combined image into the predetermined number of rendered video game frames and the second combined image into the predetermined number of additional video game frames, and encoding the predetermined number of rendered video game frames separated from the first combined image and the predetermined number of additional video game frames separated from the second combined image for transmission to one or more client devices at a second frame rate.

Example 2: The computer-implemented method of Example 1, wherein the second resolution is greater than the first resolution.

Example 3: The computer-implemented method of any of Examples 1 and 2, wherein the first resolution is 720p and the second resolution is 1080p.

Example 4: The computer-implemented method of any of Examples 1-3, wherein the second frame rate is greater than the first frame rate.

Example 5: The computer-implemented method of any of Examples 1-4, wherein the first frame rate is fifteen frames per second and the second frame rate is thirty frames per second.

Example 6: The computer-implemented method of any of Examples 1-5, wherein the predetermined number of rendered video game frames is four, and the predetermined number of additional video game frames is four.

Example 7: The computer-implemented method of any of Examples 1-6, wherein the predetermined number of rendered video game frames are received from separate video game processes.

Example 8: The computer-implemented method of any of Examples 1-7, wherein the predetermined number of rendered video game frames separated from the first combined image and the predetermined number of additional video game frames separated from the second combined image are encoded individually.

Example 9: The computer-implemented method of any of Examples 1-8, further including transmitting the encoded predetermined number of rendered video game frames separated from the first combined image and the encoded predetermined number of additional video game frames separated from the second combined image to the one or more client devices in sequence.

In some examples, a system may include at least one processor and a physical memory including computer-executable instructions that, when executed by the at least one processor, cause the at least one processor to perform various acts. For example, the computer-executable instructions may cause the at least one processor to perform acts including combining a predetermined number of rendered video game frames received at a first frame rate and a first resolution into a first combined image, generating, from the first combined image, a second combined image including a predetermined number of additional video game frames at the first resolution, upscaling the first combined image and the second combined image to a second resolution, separating the first combined image into the predetermined number of rendered video game frames and the second combined image into the predetermined number of additional video game frames, and encoding the predetermined number of rendered video game frames separated from the first combined image and the predetermined number of additional video game frames separated from the second combined image for transmission to one or more client devices at a second frame rate.

In some examples, a method may be encoded as non-transitory, computer-readable instructions on a computer-readable medium. In one example, the computer-readable instructions, when executed by at least one processor of a computing device, cause the computing device to combine a predetermined number of rendered video game frames received at a first frame rate and a first resolution into a first combined image, generate, from the first combined image, a second combined image including a predetermined number of additional video game frames at the first resolution, upscale the first combined image and the second combined image to a second resolution, separate the first combined image into the predetermined number of rendered video game frames and the second combined image into the predetermined number of additional video game frames, and encode the predetermined number of rendered video game frames separated from the first combined image and the predetermined number of additional video game frames separated from the second combined image for transmission to one or more client devices at a second frame rate.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:

combining a predetermined number of rendered video game frames received at a first frame rate and a first resolution into a first combined image;

generating, from the first combined image, a second combined image comprising a predetermined number of additional video game frames at the first resolution;

upscaling the first combined image and the second combined image to a second resolution, wherein the upscaling increases image resolution using an interpolation algorithm to infer additional pixel data;

separating the upscaled first combined image into the predetermined number of rendered video game frames and the upscaled second combined image into the predetermined number of additional video game frames; and encoding the predetermined number of rendered video game frames separated from the first combined image and the predetermined number of additional video game frames separated from the second combined image for transmission to one or more client devices at a second frame rate.

2. The computer-implemented method of claim 1, wherein the second resolution is greater than the first resolution.

3. The computer-implemented method of claim 2, wherein the first resolution is 720p and the second resolution is 1080p.

4. The computer-implemented method of claim 1, wherein the second frame rate is greater than the first frame rate.

5. The computer-implemented method of claim 4, wherein the first frame rate is fifteen frames per second and the second frame rate is thirty frames per second.

6. The computer-implemented method of claim 1, wherein:

the predetermined number of rendered video game frames is four; and the predetermined number of additional video game frames is four.

7. The computer-implemented method of claim 1, wherein the predetermined number of rendered video game frames are received from separate video game processes.

8. The computer-implemented method of claim 1, wherein the predetermined number of rendered video game frames separated from the first combined image and the predetermined number of additional video game frames separated from the second combined image are encoded individually.

9. The computer-implemented method of claim 1, further comprising transmitting the encoded predetermined number of rendered video game frames separated from the first combined image and the encoded predetermined number of additional video game frames separated from the second combined image to the one or more client devices in sequence.

10. A system comprising:

at least one physical processor; and physical memory comprising computer-executable instructions that, when executed by the at least one physical processor, cause the at least one physical processor to perform acts comprising:

combining a predetermined number of rendered video game frames received at a first frame rate and a first resolution into a first combined image;

generating, from the first combined image, a second combined image comprising a predetermined number of additional video game frames at the first resolution;

upscaling the first combined image and the second combined image to a second resolution, wherein the upscaling increases image resolution using an interpolation algorithm to infer additional pixel data;

separating the upscaled first combined image into the predetermined number of rendered video game frames and the upscaled second combined image into the predetermined number of additional video game frames; and encoding the predetermined number of rendered video game frames separated from the first combined image and the predetermined number of additional video game frames separated from the second combined image for transmission to one or more client devices at a second frame rate.

11. The system of claim 10, wherein the second resolution is greater than the first resolution.

12. The system of claim 11, wherein the first resolution is 720p and the second resolution is 1080p.

13. The system of claim 10, wherein the second frame rate is greater than the first frame rate.

14. The system of claim 13, wherein the first frame rate is fifteen frames per second and the second frame rate is thirty frames per second.

15. The system of claim 10, wherein:

the predetermined number of rendered video game frames is four; and the predetermined number of additional video game frames is four.

16. The system of claim 11, wherein the predetermined number of rendered video game frames are received from separate video game processes.

17. The system of claim 11, wherein the predetermined number of rendered video game frames separated from the first combined image and the predetermined number of additional video game frames separated from the second combined image are encoded individually.

18. The system of claim 11, further comprising computer-executable instructions that, when executed by the at least one physical processor, cause the at least one physical processor to perform an act comprising transmitting the encoded predetermined number of rendered video game frames separated from the first combined image and the encoded predetermined number of additional video game frames separated from the second combined image to the one or more client devices in sequence.

19. A non-transitory computer-readable medium comprising one or more computer-executable instructions that, when executed by at least one processor of a computing device, cause the computing device to:

combine a predetermined number of rendered video game frames received at a first frame rate and a first resolution into a first combined image;

generate, from the first combined image, a second combined image comprising a predetermined number of additional video game frames at the first resolution;

upscale the first combined image and the second combined image to a second resolution, wherein the upscaling increases image resolution using an interpolation algorithm to infer additional pixel data;

separate the upscaled first combined image into the predetermined number of rendered video game frames and the upscaled second combined image into the predetermined number of additional video game frames; and encode the predetermined number of rendered video game frames separated from the first combined image and the predetermined number of additional video game frames separated from the second combined image for transmission to one or more client devices at a second frame rate.

20. The non-transitory computer-readable medium of claim 19, wherein the second resolution is greater than the first resolution and the second frame rate is greater than the first frame rate.

* * * * *